US008127206B2

(12) United States Patent
Singh et al.

(10) Patent No.: US 8,127,206 B2
(45) Date of Patent: Feb. 28, 2012

(54) SYSTEM AND METHOD FOR WIRELESS COMMUNICATION OF UNCOMPRESSED VIDEO HAVING REED-SOLOMON CODE ERROR CONCEALMENT

(75) Inventors: Harkirat Singh, Santa Clara, CA (US);
Xiangping Qin, San Jose, CA (US);
Huai-Rong Shao, Santa Clara, CA (US);
Chiu Ngo, San Francisco, CA (US);
Huaning Niu, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1063 days.

(21) Appl. No.: 12/024,898

(22) Filed: Feb. 1, 2008

(65) Prior Publication Data
US 2009/0077611 A1   Mar. 19, 2009

Related U.S. Application Data

(60) Provisional application No. 60/972,186, filed on Sep. 13, 2007.

(51) Int. Cl.
*G11C 29/00* (2006.01)
(52) U.S. Cl. .................. 714/769; 714/784; 714/748
(58) Field of Classification Search .................. 714/784, 714/748, 6, 2, 752, 746
See application file for complete search history.

(56) References Cited

U.S. PATENT DOCUMENTS

| 6,161,207 | A | 12/2000 | Lockhart et al. |
| 6,629,284 | B1 * | 9/2003 | Leermakers .................. 714/748 |
| 6,681,364 | B1 | 1/2004 | Calvignac et al. |
| 6,757,851 | B1 | 6/2004 | Park et al. |
| 7,043,681 | B2 | 5/2006 | Kroeger et al. |
| 7,346,018 | B2 | 3/2008 | Holtzman et al. |
| 7,346,037 | B2 | 3/2008 | Yun et al. |
| 7,599,363 | B2 | 10/2009 | Jang et al. |
| 2004/0052253 | A1 * | 3/2004 | Leermakers .................. 370/390 |
| 2004/0221223 | A1 | 11/2004 | Yu et al. |

(Continued)

FOREIGN PATENT DOCUMENTS
CN       1292626       4/2001

(Continued)

OTHER PUBLICATIONS

U.S. Appl. No. 60/773,826, filed Feb. 15, 2006, Shao et al.

(Continued)

*Primary Examiner* — Fritz Alphonse
(74) *Attorney, Agent, or Firm* — Kenneth L. Sherman, Esq.; Michael Zarrabian, Esq.; Myers Andras Sherman & Zarrabian LLP

(57) ABSTRACT

A system and method for wireless communication of uncompressed video data includes concealing corrupted portions of video data. Video packets received are transmitted over a wireless channel. Each of the video packets includes data blocks forming video data representing at least part of a video frame. Each of the data blocks is encoded with an error correction code. A data block determined to be corrupted is replaced with an uncorrupted data block selected from the data blocks in the video packets. The corrupted data block includes a first displayable element on the video frame and the uncorrupted data block includes a second displayable element on the video frame. The uncorrupted data block is selected at least partially based on proximity between the first and second displayable elements on the video frame.

27 Claims, 14 Drawing Sheets

U.S. PATENT DOCUMENTS

| | | | |
|---|---|---|---|
| 2005/0123042 | A1 | 6/2005 | Park et al. |
| 2006/0034277 | A1 | 2/2006 | Jang et al. |
| 2006/0034317 | A1 | 2/2006 | Hong et al. |
| 2007/0165566 | A1 | 7/2007 | Khan et al. |
| 2007/0189397 | A1 | 8/2007 | Ngo et al. |
| 2007/0234134 | A1 | 10/2007 | Shao et al. |
| 2009/0086638 | A1 | 4/2009 | Niu et al. |
| 2009/0086699 | A1 | 4/2009 | Niu et al. |
| 2009/0132893 | A1 | 5/2009 | Miyazaki et al. |
| 2009/0164838 | A1* | 6/2009 | Haller ............................ 714/6 |

FOREIGN PATENT DOCUMENTS

| | | |
|---|---|---|
| WO | WO 00/02320 | 1/2000 |
| WO | WO 2004/034654 | 4/2004 |

OTHER PUBLICATIONS

Hachman, "CE Giants back Amimon's Wireless HDTV Tech," PCMAG.com, 1 page (Jul. 23, 2008).

"NEC develops compact millimeter-wave transceiver for uncompressed HDTV signal transmission," *NE Asia Online*, Apr. 5, 2005, (Downloaded from http://neasia.nikkeibp.com/topstory/000913 on Sep. 29, 2006.).

WirelessHD Specification Version 1.0 Overview, Oct. 9, 2007, 77 pages.

FreshNews.com, SiBEAM Receives Equity Investment from Best Buy, http://freshnews.com/print/node/261440, Jan. 4, 2010, 2 pages.

Hitachi et al., High-Definition Multimedia Interface (HDMI) Specifications version 1.2, Aug. 22, 2005, pp. 1-214.

Van Veen et al., Beamforming: A Versatile Approach to Spatial Filtering, IEEE ASSP Magazine, Apr. 1988, 5(2): 4-24.

Wu et al., A Vacation Model with Setup and Close-down Times for Transmitter Buffer of ARQ Schemes, 14th IEEE Proceedings on Personal, Indoor and Mobile Radio Communications (PIMRC), Sep. 7-10, 2003, vol. 3: 2054-2058.

International Preliminary Report on Patentability of Sep. 30, 2008 for PCT/KR2007/001528, filed Mar. 29, 2007.

International Search Report dated Jul. 9, 2007 for PCT/KR2007/001528, filed Mar. 29, 2007.

U.S. Office Action dated Sep. 1, 2009 in U.S. Appl. No. 11/906,193, filed Oct. 1, 2007.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

Masala et al., MAC-Level Partial Checksum for H.264 Video Transmission over 802.11 Ad Hoc Wireless Networks, Vehicular Technology Conference, 2005. VTC 2005—Spring. 2005 IEEE 61st, IEEE, Piscataway, NJ, USA, vol. 5, May 30, 2005, pp. 2864-2868.

Chinese Office Action dated Mar. 29, 2010 from Chinese Application No. 200780007976.2, filed Mar. 29, 2006.

European Supplemental Search Report dated Apr. 1, 2010 for European Application No. 07745691-1, filed Mar. 29, 2007.

U.S. Office Action dated Mar. 5, 2010 in U.S. Appl. No. 11/906,193, filed Oct. 1, 2007.

U.S. Notice of Allowance dated Jun. 24, 2010 in U.S. Appl. No. 11/906,193, filed Oct. 1, 2007.

U.S. Non-final Office Action for U.S. Appl. No. 11/728,002 mailed Nov. 18, 2010.

\* cited by examiner

BEFORE CONCEALMENT

AFTER CONCEALMENT

BEFORE CONCEALMENT

AFTER CONCEALMENT

BEFORE CONCEALMENT

AFTER CONCEALMENT

950

RS code statue bitmap

SYSTEM AND METHOD FOR WIRELESS COMMUNICATION OF UNCOMPRESSED VIDEO HAVING REED-SOLOMON CODE ERROR CONCEALMENT

CROSS-REFERENCE TO RELATED APPLICATIONS

This application claims the priority benefit under 35 U.S.C. §119(e) of U.S. Provisional Application No. 60/972,186, filed on Sep. 13, 2007, the disclosure of which is incorporated herein by reference.

BACKGROUND OF THE INVENTION

1. Field of the Invention

The present invention relates to wireless transmission of media data, and particularly to transmission of uncompressed high definition video data over wireless channels.

2. Description of the Related Technology

With the proliferation of high quality video, an increasing number of electronic devices, such as consumer electronic devices, utilize high definition (HD) video which can require multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices which do not have the bandwidth to carry the uncompressed HD signals are connected.

Transfer of uncompressed video signals requires more use of wireless channels than that of compressed video signals because of a higher volume of data being transferred. Beyond efficient use of wireless channels, accuracy and quality of data being transferred should also be considered.

Wireless communication systems for transmitting video data can experience varying wireless channel conditions. Varying wireless channel conditions, particularly channel quality degradation, can adversely affect data transmission quality. In uncompressed video data transmission, because a large amount of data is transmitted over a wireless channel, channel quality degradation can significantly adversely affect the data transmission quality.

One conventional approach to solve this problem is to retransmit a video data packet in error. Such retransmission of a video data packet requires additional use of the wireless channel. In certain instances in which video data packets are immediately processed for playback at the receiver, the timing constraint may not permit such retransmission. Therefore, there is a need to provide a wireless receiver with a method which can effectively correct or conceal video data packets in error.

SUMMARY OF CERTAIN INVENTIVE ASPECTS

In one embodiment, there is a method of wireless communication for uncompressed video data. The method comprises receiving a plurality of video packets transmitted over a wireless channel. Each of the video packets includes a plurality of data blocks. The data blocks in the plurality of video packets together form video data representing at least part of a video frame. Each of the data blocks includes a plurality of displayable elements, and each of the data blocks is encoded with an error correction code (ECC). The method further includes determining whether any of the plurality of data blocks in the video packets has been corrupted, using the ECC, while being transmitted over the wireless channel; and replacing a corrupted data block with an uncorrupted data block selected from the plurality of data blocks in the plurality of video packets. The corrupted data block includes a first displayable element on the video frame and the uncorrupted data block includes a second displayable element on the video frame. The uncorrupted data block is selected at least partially based on proximity between the first and second displayable elements on the video frame. The error correction code may comprise a Reed-Solomon (RS) code. The displayable elements may comprise uncompressed pixel data.

In another embodiment, there is a wireless communication device for receiving uncompressed video data. The device comprises: a receiver configured to receive a plurality of video packets transmitted over a wireless channel. Each of the video packets includes a plurality of data blocks. The data blocks in the plurality of video packets together form video data representing at least part of a video frame. Each of the data blocks includes a plurality of displayable elements, and is encoded with an error correction code (ECC). The receiver is further configured to determine whether any of the plurality of data blocks in the video packets has been corrupted while being transmitted over the wireless channel. The receiver is further configured to replace a corrupted data block with an uncorrupted data block selected from the plurality of data blocks in the plurality of video packets. The corrupted data block includes a first displayable element on the video frame. The uncorrupted data block includes a second displayable element on the video frame. The uncorrupted data block is selected at least partially based on proximity between the first and second displayable elements on the video frame.

In yet another embodiment, there is a wireless communication system for uncompressed video data. The system comprises: a transmitter configured to transmit a plurality of video packets over a wireless channel. Each of the video packets includes a plurality of data blocks. The data blocks in the plurality of video packets together form video data representing at least part of a video frame. Each of the data blocks includes a plurality of displayable elements, and is encoded with an error correction code (ECC). The system also includes a receiver configured to receive the plurality of video packets transmitted over the wireless channel, and to decode the ECC-encoded data blocks. The receiver is further configured to determine whether any of the plurality of data blocks in the video packets has been corrupted while being transmitted over the wireless channel. The receiver is further configured to replace a corrupted data block with an uncorrupted data block selected from the plurality of data blocks in the plurality of video packets. The corrupted data block includes a first displayable element on the video frame. The uncorrupted data block includes a second displayable element on the video frame. The uncorrupted data block is selected at least partially based on proximity between the first and second displayable elements on the video frame.

DETAILED DESCRIPTION OF CERTAIN INVENTIVE EMBODIMENTS

Figure 1:
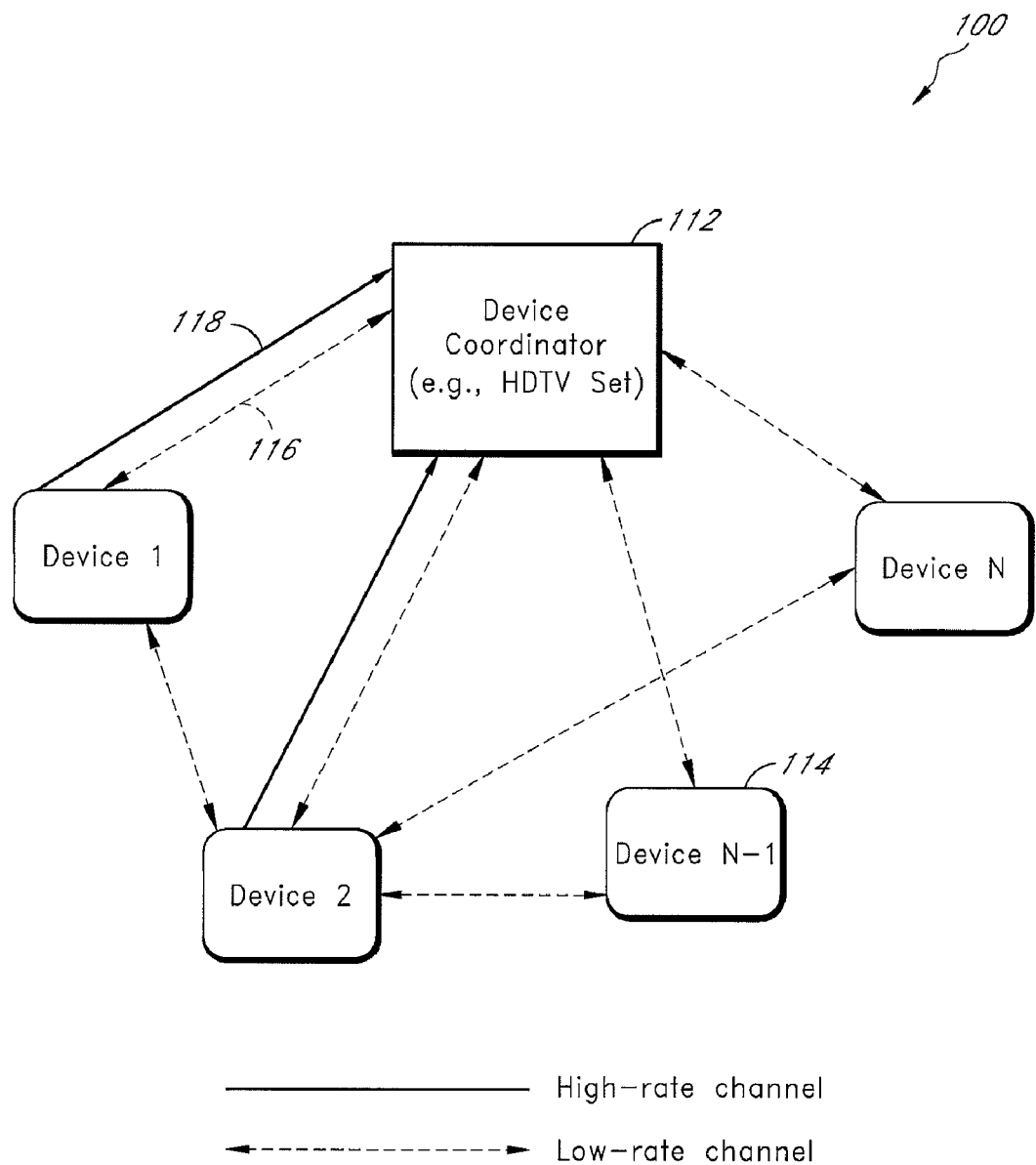
FIG. 1 is a functional block diagram of an exemplary configuration of a wireless network that implements uncompressed HD video transmission between wireless devices, according to one embodiment of the system and method.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Overview of Communication System

Certain embodiments provide a method and system for transmission of uncompressed HD video information from a sender to a receiver over wireless channels.

In certain embodiments, a wireless video area network (WVAN) consists of one Coordinator and one or more stations as shown in FIG. 1. The Coordinator is normally, but not always, a device that is a sink for audio or video data, e.g., a display, but also potentially can be a media storage device like a personal video recorder (PVR). A station, on the other hand, is a device that has media that it can be either source or sink, potentially at the same time with the time division duplex (TDD) scheme.

The computing and networking industry uses the Open Systems Interconnection Reference Model (OSI model) for communications and computer network protocol design. The OSI model is a hierarchical structure of seven layers that defines the requirements for communications between multiple devices. The seven layers include an application layer, a presentation layer, a session layer, a transport layer, a network layer, a data link layer, and a physical layer.

Of particular relevance here are the data link and physical layers. The data link layer provides the functional and procedural ways to transfer data between network entities and to detect and possibly correct errors that may occur in the physical layer. The data link layer is divided into two sublayers: a Media Access Control (MAC) layer and a Logical Link Control (LLC) layer. The MAC layer controls how a computer on the network gains access to the data and permission to transmit it. The LLC layer controls frame synchronization, flow control and error checking. The physical (PHY) layer defines the electrical and physical specifications for devices.

In certain embodiments, a high-rate PHY layer (HRP) is a PHY layer that supports multi-Gbs throughput at a short distance through adaptive antenna technology. Because of this, in certain embodiments, the HRP is highly directional and can only be used for unicast connections as shown in FIG. 1. The HRP is optimized for the delivery of uncompressed high-definition video, but other data can be communicated using the HRP. To support multiple video resolutions, the HRP has more than one data rate defined. The HRP carries isochronous data such as audio and video, asynchronous data, MAC commands, antenna steering information, and higher layer control data for ANV devices.

In certain embodiments, a low-rate PHY layer (LRP) is a multi-Mb/s bidirectional link that also provides a short range. Multiple data rates are defined for the LRP, with the lower data rates having near omni-directional coverage while the highest data rates are directional as shown in FIG. 1. Because the LRP has near omni-directional modes, it can be used for both unicast and broadcast connections. Furthermore, because all stations support the LRP, it can be used for station-to-station links. The LRP supports multiple data rates, including directional modes, and is used to carry low-rate isochronous data such as audio, low-rate asynchronous data, MAC commands including the beacon frame, acknowledgements for HRP packets, antenna steering information, capabilities information, and higher layer control data for A/V devices.

The HRP and LRP operate in overlapping frequency bands and so they are coordinated in a TDMA (time division multiple access) manner by the MAC. The WVAN supports at least one uncompressed 1080$p$ video stream with associated audio at a time. Multiple lower rate uncompressed video streams, e.g., two 1080$i$ video streams, are also supported.

In certain embodiments, the WVAN supports two types of devices: a coordinator and a station. The coordinator controls the timing in the WVAN, keeps track of the members of the WVAN, transmits or receives data using the LRP or using the HRP. The station transmits and receives data using the LRP, initiates stream connections, and transmits or receives data using the HRP. The station may be capable of acting as a coordinator in the WVAN. Such a station is referred to as being coordinator capable.

All compliant devices are able to transmit and receive using the LRP. Both the HRP and LRP may provide multiple data rates.

Detailed Operation of the Communication Systems

Example implementations of the embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gbs bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channels. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
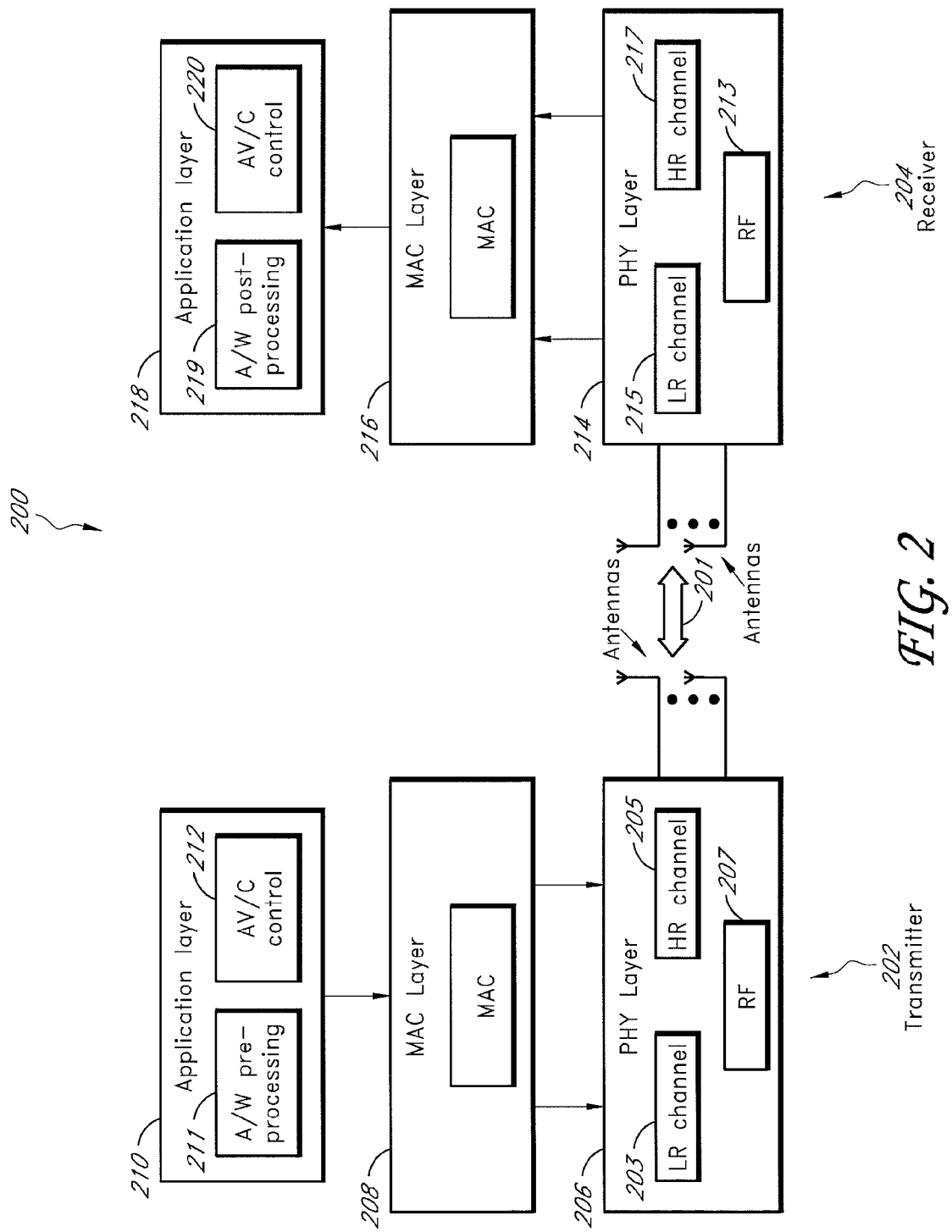
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Corrupted Data Concealment Schemes

In a wireless communication system for transmission of uncompressed video data, data packets including video data may be transmitted from a transmitter to a receiver over a wireless channel. The video data can include displayable elements, e.g., pixel data including luminance data and/or chrominance data. During the wireless transmission, one or more of the data packets may be at least partially corrupted due to varying wireless channel conditions (e.g., wireless channel instability and the existence of a moving object between the transmitter and receiver).

In certain embodiments, corrupted data packets may be retransmitted from the transmitter to the receiver. However, such retransmission of data packets may not be desirable because the retransmission increases channel traffic. In other instances, the receiver is designed to immediately supply video data in the data packets to another device (e.g., a video playback device), and thus may not have sufficient time for such retransmission. In addition, when the channel condition during the retransmission is the same as that during the original transmission, the retransmission may not provide the receiver with uncorrupted data packets. Therefore, there is a need to correct or conceal corrupted data at the receiver without or in combination with retransmission.

In one embodiment, a wireless communication system wirelessly transmits video data packets from a transmitter to a receiver. The system may use an error correction code to self-correct errors that may occur during the wireless transmission. Exemplary error correction codes are algebraic codes such as BCH (Bose-Chaudry-Hocquehen) multiple burst correcting cyclic codes.

An exemplary BCH code is a Reed-Solomon (RS) code. The RS code operates on a block (e.g., bytes of fixed length) of data. A data block is generally a portion of data that can be encoded with an error correction code. In one embodiment where an RS (224, 216, t=4) code is used, each block of data includes 216 bytes, and each RS code is 224 bytes long. Under an RS coding scheme, redundant or parity data is added to a block of data at the transmitter, thereby generating an RS code. The RS code is further processed at the transmitter for wireless transmission, and then is transmitted to the receiver over the wireless channel. Given m redundant or parity bytes, the receiver can correct up to m byte errors in known positions in the block of data, or detect and correct up to m/2 byte errors in unknown positions in the block of data by decoding the RS code.

In certain situations where the receiver cannot self-correct errors in video data packets, the receiver according to one embodiment is configured to conceal the errors without requesting retransmission of the data packets from the transmitter. The receiver may be configured to replace a corrupted data block with a replacement data block selected from either the same data packet or another data packet.

In one embodiment, video data packets include video data representing at least a portion of a video frame. A replacement data block may be selected based on the proximity between the corrupted and replacement data blocks within the frame. This configuration permits effective error concealment while minimizing degradation of the video image quality because pixels proximate to each other typically have the same or similar displayable values, e.g., luminance or chrominance. In certain embodiments, this concealment scheme may be combined with a packet retransmission scheme, thereby providing enhanced error concealment or correction.

Figure 3A:
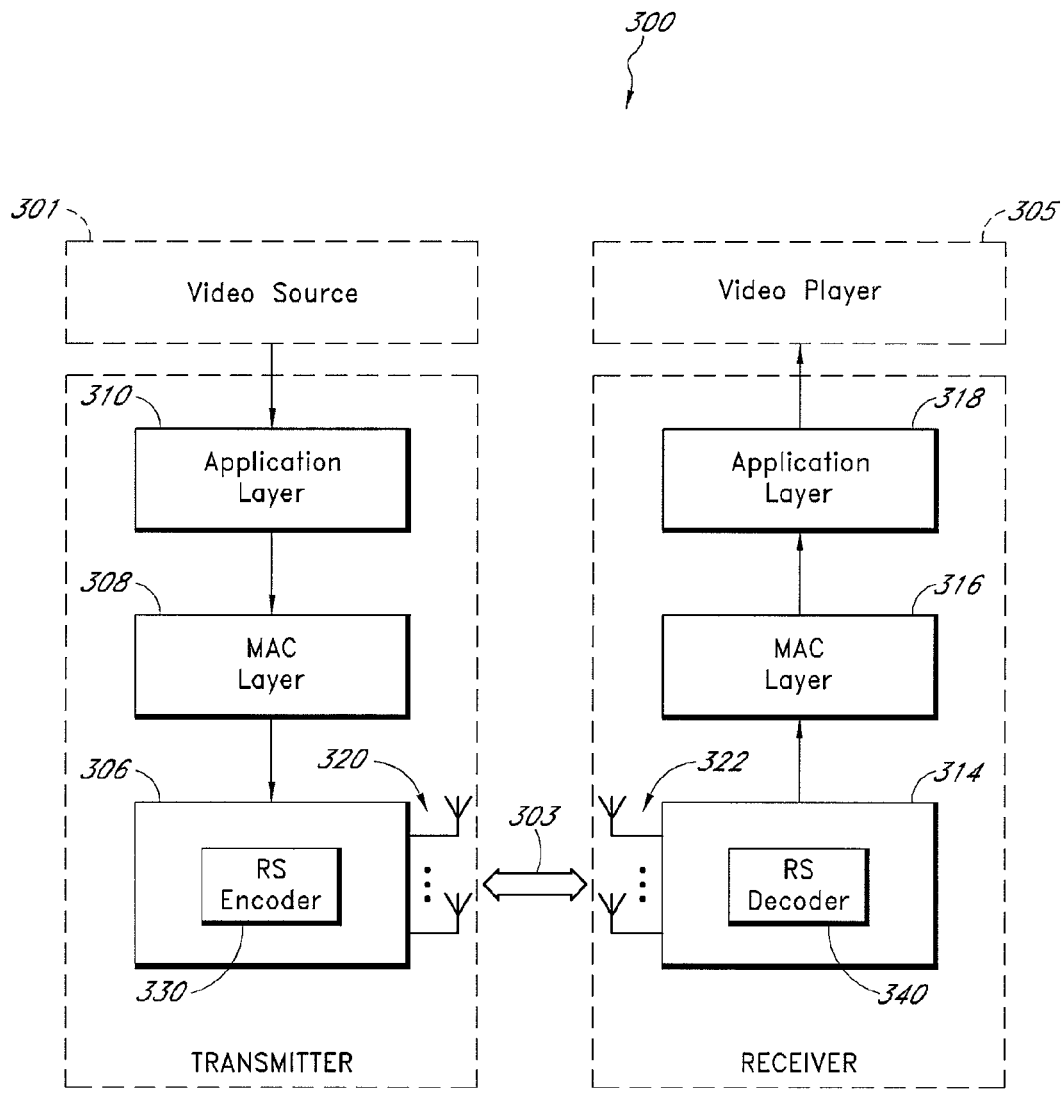
FIG. 3A is a functional block diagram of an example communication system for transmission of uncompressed HD video over wireless medium, according to another embodiment of the system and method.

FIG. 3A illustrates a functional block diagram of another example communication system 300. The system 300 includes a video source 301, a wireless transmitter 302, a wireless receiver 304, and a video player 305. The transmitter 302 includes a physical (PHY) layer 306, a media access control (MAC) layer 308 and an application layer 310. Similarly, the receiver 304 includes a PHY layer 314, a MAC layer 316, and an application layer 318. The PHY layers 306, 314 provide wireless communication between the transmitter 302 and the receiver 304 via one or more antennas 320, 322 over a wireless channel 303. In one embodiment, the wireless channel 303 is a 60 GHz channel.

In the illustrated embodiment, the PHY layer 306 of the transmitter 302 includes a Reed-Solomon (RS) encoder 330. The RS encoder 330 generates an RS code for each data block. The RS code is used to add redundant (parity) data to the video data. The redundant data allows the receiver 304 to detect and self-correct errors. In other embodiments, the transmitter 302 may include an encoder using a different error correction coding scheme.

The PHY layer 314 of the receiver 304 includes a Reed-Solomon (RS) decoder 340. The RS decoder 340 is used to decode the RS-codes included in each packet. The RS decoder 340 in the receiver 302 may self-correct errors in the video data as long as the number of the errors does not exceed a limit.

In one embodiment, a data packet may include video data blocks, each of which is encoded with an RS code. Each of the RS-encoded video data blocks (hereinafter, also referred to as "RS code") may include 8 bytes of parity data. In such an embodiment, if 4 bytes or less of data in an RS code has been corrupted during wireless transmission, the RS decoder 340 may self-correct the corrupted data. If, however, more than 4 bytes of data in a RS code has been corrupted during wireless transmission, the receiver 304 may conceal the corrupted data using schemes which will be described below, or request retransmission of the data packet which includes the RS code. An RS code without an error and a self-correctible RS code may be referred to as "good" RS codes while an RS code that cannot be self-corrected is referred to as "corrupted or erroneous" RS code.

Figure 3B:
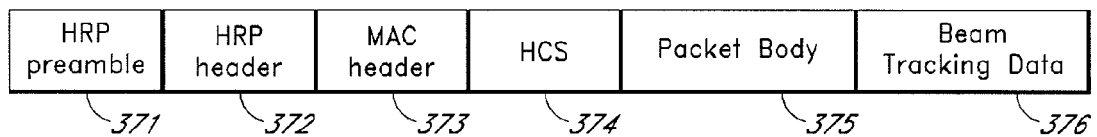
FIG. 3B illustrates one embodiment of the frame format of a video data packet transmitted between wireless devices of FIG. 3A.

FIG. 3B illustrates one embodiment of the frame format of a data packet 370 which can be used in the communication system of FIG. 3A. The illustrated data packet includes a high-rate PHY (HRP) preamble 371, an HRP header 372, a MAC header 373, a header checksum (HCS) field 374, a packet body 375, and a beam tracking data field 376.

The HRP preamble 371 can be used to detect the start of the data packet. In addition, the HRP preamble 371 can also be used to estimate various channel parameters, such as symbol timing and carrier frequency offset so that data reception can be done successfully. The HRP preamble 371 can have a length which depends upon the physical (PHY) layer technology and the transmission mode.

The HRP header 372 can be used to indicate the status of video packets or sub-packets which are included in the packet body 375. The MAC header 373 can serve to indicate source and destination addresses.

The header checksum field 374 includes a checksum calculated from at least one of the headers 372, 373 to detect errors that may occur during wireless transmission. The checksum is computed and appended before transmission. Then, the checksum is verified afterwards at the receiver to confirm that no change has occurred during transmission.

The packet body 375 may include one or more video packets or sub-packets. In one embodiment, the one or more video packets or sub-packets may be video packets. In such an embodiment, the video packets can include video data representing at least part of a video frame. Each of the video packets may include a plurality of video data blocks. Each of the plurality of data blocks may be encoded with an error correction code (ECC), for example, a Reed-Solomon (RS) code. In addition, each video packet may include a checksum for error detection.

In one embodiment, each of the plurality of data blocks is encoded into an RS code (224, 216, t=4) which can self-correct up to 4 bytes of data. In such an embodiment, each of the RS codes includes 216 bytes of video data and 8 bytes of parity data. The video data included in a single RS code may include data representing a group of pixels in a video frame.

The beam tracking data field 376 includes data required for beam tracking between the transmitter 302 and the receiver 304. Beam-tracking provides adjustments to the output signals from the antenna elements 320, 322. These adjustments mitigate certain impairment due to changes in the environment. Beam-tracking also provides fine tuning so that the wireless link between the devices remains operational. The data in the beam tracking data field 376 may be indicative of the status of various beam-tracking parameters at either or both of the transmitter 302 and the receiver 304.

Figure 4A:
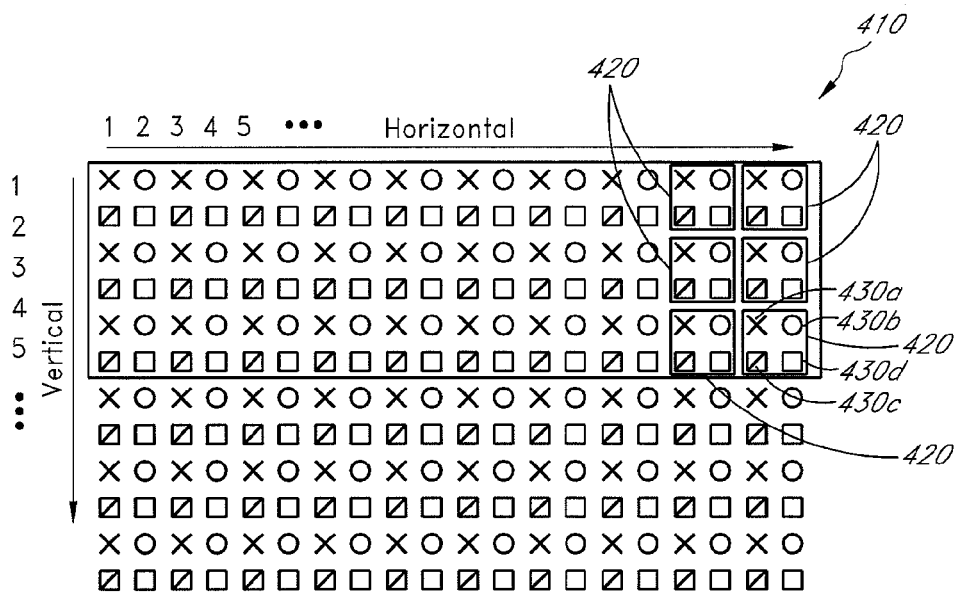
FIG. 4A illustrates a video frame including a plurality of pixels according to one embodiment.
Figure 4B:
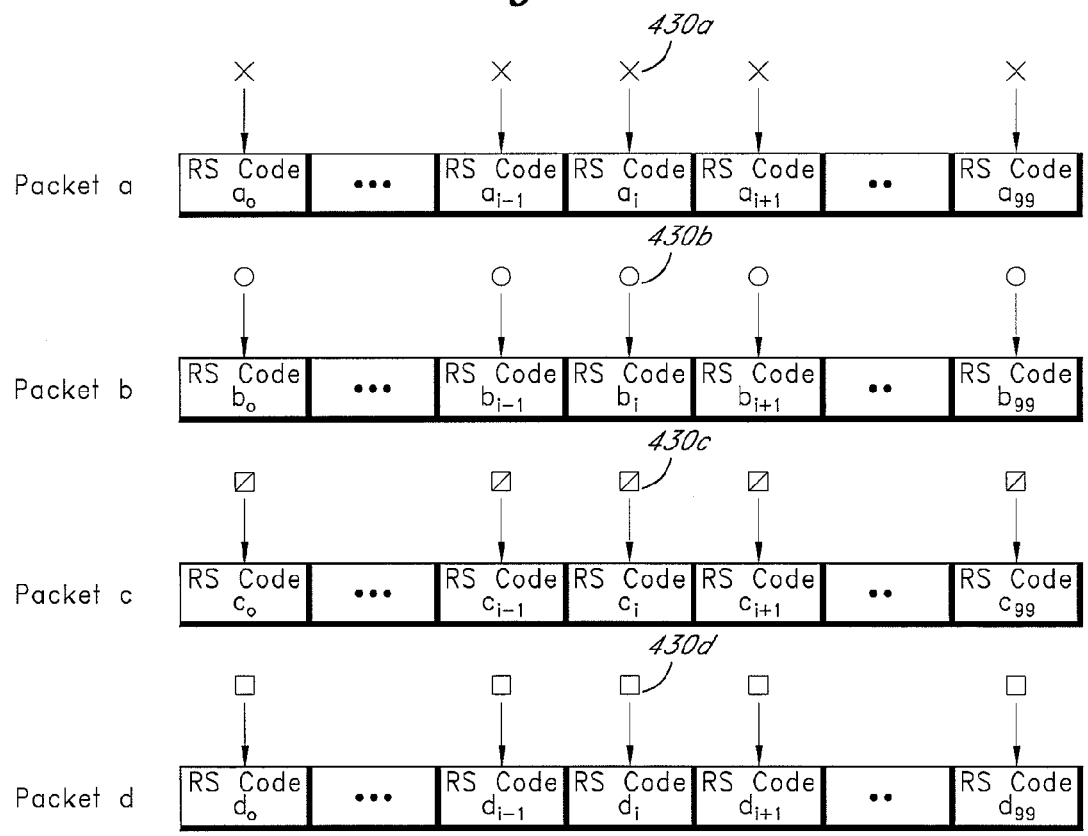
FIG. 4B illustrates video packets, each including RS codes including data representing the pixels of FIG. 4A.

Referring to FIGS. 4A and 4B, a method of packetizing video data according to one embodiment will now be described. In FIG. 4A, an uncompressed video frame 410 includes a plurality of pixel blocks 420 across the video frame 410. Each of the pixel blocks 420 includes a plurality of pixels. In the illustrated embodiment, each of the pixel blocks 420 includes four pixels 430a-430d which are represented by different symbols.

Referring to FIG. 4B, each of video packets a-d includes 100 RS codes a0-a99, b0-b99, c0-c99, d0-d99 in sequence. Each of the RS codes includes video data encoded under an RS coding scheme. In the illustrated embodiment, video data included in a single RS code is 216 bytes long. Thus, the total length of the video data in a video packet is 21600 bytes. Each of the RS codes a0-a99, b0-b99, c0-c99, d0-d99 includes video data representing a plurality of pixels. The number of pixels represented by data in a single RS code depends on the number of bytes of data that represents a single pixel. For example, where a single pixel is represented by 24 bytes of data, the single RS code can include video data for 9 pixels. A skilled technologist will appreciate that the configuration of the video packets can vary widely depending on the wireless system design. The video packets a-d can be included in the packet bodies of four separate data packets (e.g., the data packet of FIG. 3b). In other embodiments, the video packets may be included as sub-packets in the packet body of a single data packet.

In the illustrated embodiment, each of video packets a-d includes pixels represented by the same symbol in FIG. 4A. In other words, pixel data for at least some pixels represented by the same symbol in FIG. 4A are placed into the same video packet in FIG. 4B. For example, pixel data for at least some pixels represented by the symbol "x" are placed into the packet a in FIG. 4B. Similarly, pixel data for at least some other pixels represented by the symbol "o" are placed into the packet b in FIG. 4B. Each symbol is a portion of a data block.

In the illustrated embodiment, data representing the pixels 430a-430b in the same pixel block 420 on the video frame are placed in four different packets a-d, but at the corresponding positions in the packets a-d. For example, the data representing the pixels 430a-430d are placed into i-th RS codes $a_i$, $b_i$, $c_i$, $d_i$ in the data packets a-d, respectively. Data for pixels in other pixel blocks are placed in other corresponding RS codes in the same manner.

Figure 5A:
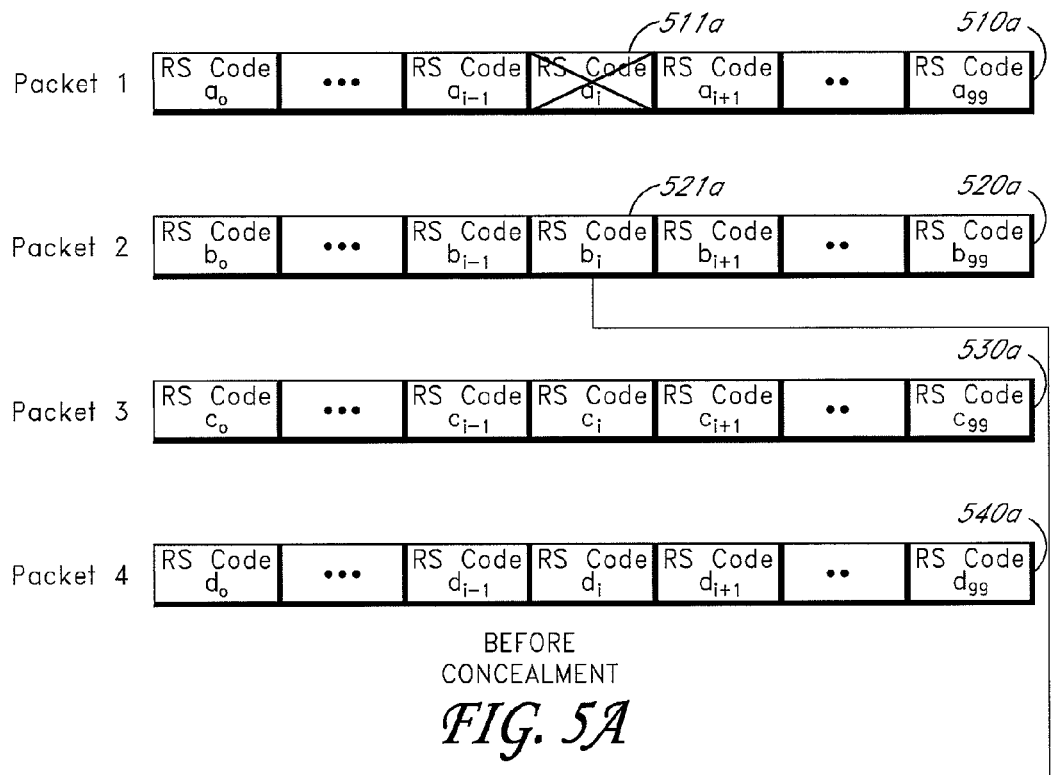
FIGS. 5A and 5B illustrate a method of concealing corrupted RS codes according to one embodiment.
Figure 5B:
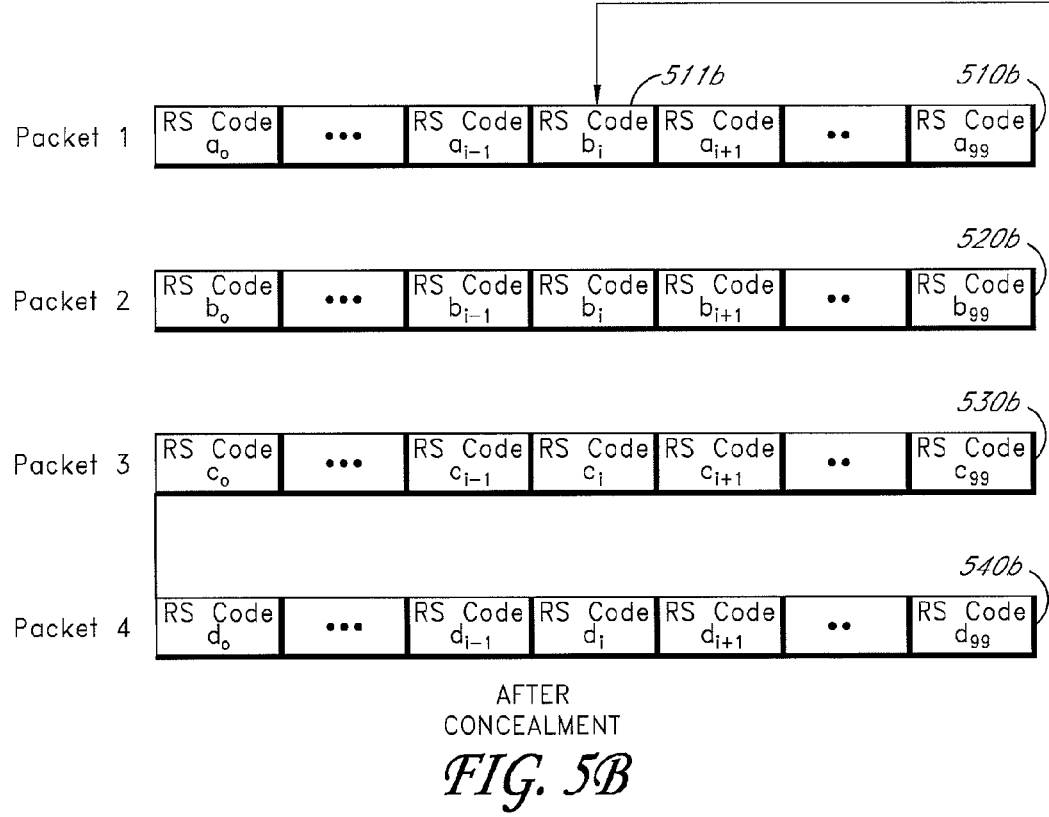

Referring to FIGS. 5A and 5B, a method of concealing corrupted or erroneous RS codes according to one embodiment will now be described. FIG. 5A illustrates an example of four original video packets transmitted from a transmitter to a receiver. The four video packets include first to fourth video packets 510a, 520a, 530a, 540a. In the example, the first video packet 510a includes an RS code 511a which has been corrupted during the wireless transmission. The corrupted RS code 511a is at the i-th position in the first video packet 510a.

FIG. 5B illustrates an example of the four video packets 510b, 520b, 530b, 540b with the corrupted RS code 511a having been replaced by a replacement RS code 511b. In the illustrated example, the replacement RS code 511b is a copy of a good RS code 521a in the original second video packet 520a. The replacement RS code 521a in the second video packet 520a is at a position which corresponds to that of the corrupted RS code 511a in the first video packet 510a. If the video packet 520a does not have a good RS code for replacement at the corresponding position, any good RS codes at the corresponding positions in the other video packets 530a, 540a may alternatively be used for replacing the corrupted RS code 511a.

Figure 6A:
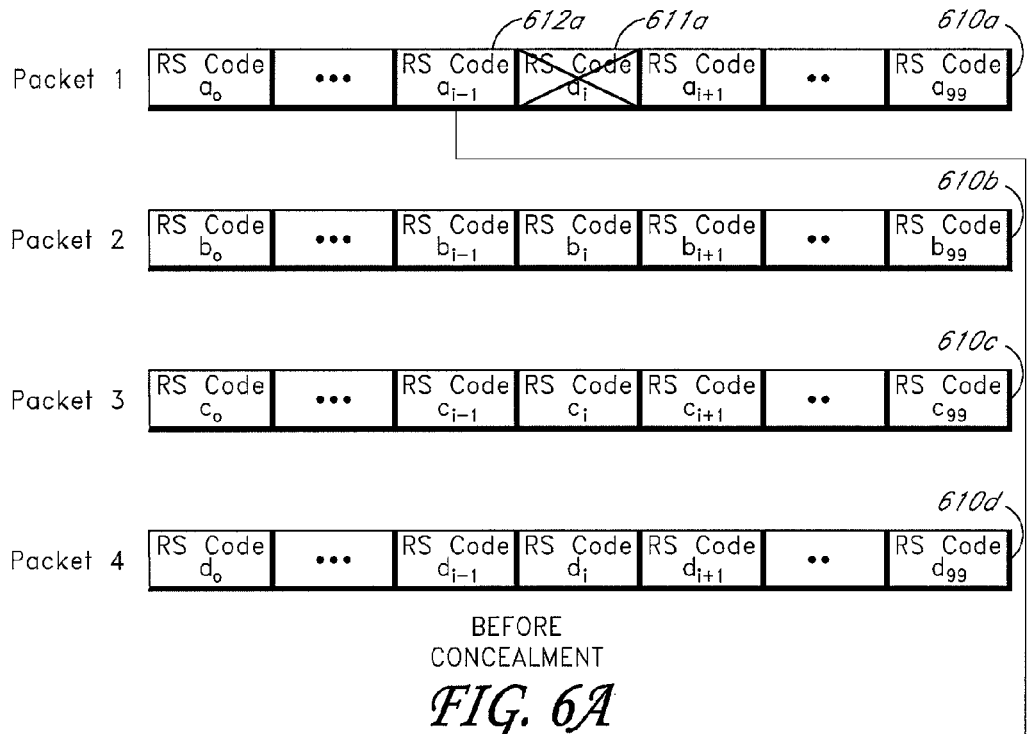
FIGS. 6A and 6B illustrate a method of concealing corrupted RS codes according to another embodiment.
Figure 6B:
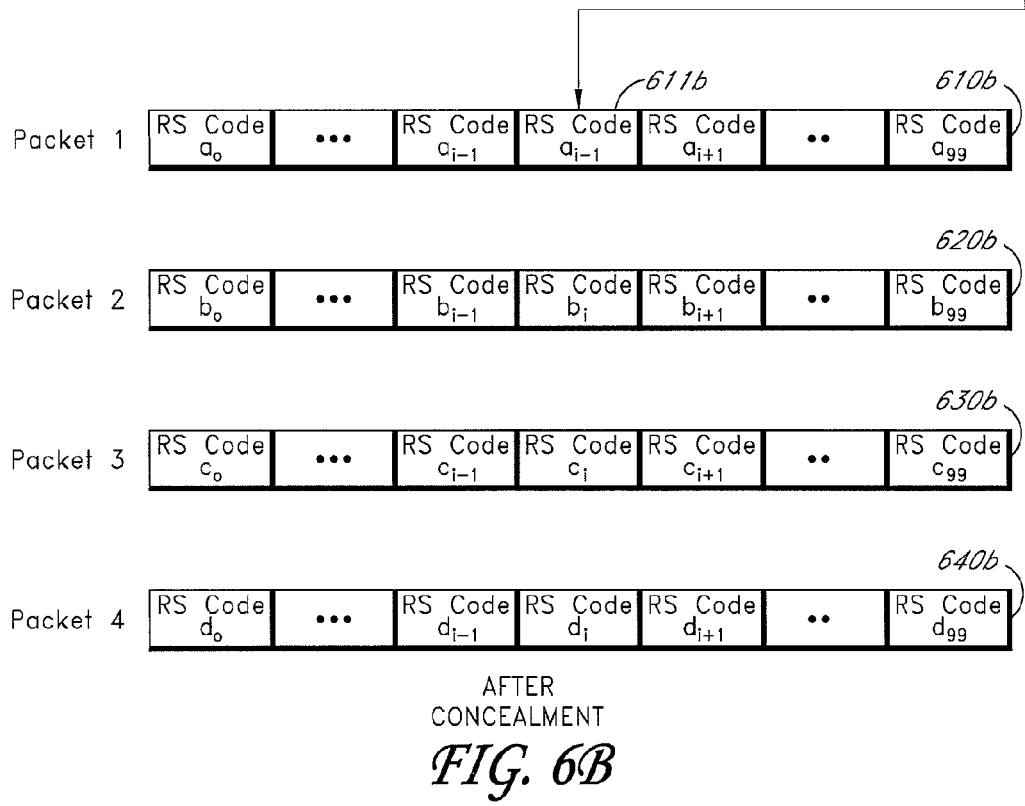

Referring to FIGS. 6A and 6B, a method of concealing corrupted RS code according to another embodiment will now be described. FIG. 6A illustrates an example of four original video packets transmitted from a transmitter to a receiver. The four video packets include first to fourth video packets 610a, 620a, 630a, 640a. In the example, the first video packet 610a includes an RS code 611a which has been corrupted during the wireless transmission. The corrupted RS code 611a is at the i-th position in the first video packet 610a.

FIG. 6B illustrates an example of four video packets 610b, 620b, 630b, 640b with the corrupted RS code 611a having been replaced by a replacement RS code 611b. In the illustrated example, the replacement RS code 611b is a copy of a good RS code 612a in the same first video packet 610a. In the illustrated embodiment, the RS code that is copied is immediately next to the corrupted RS code 611a in the same video packet 610a. In other embodiments, there can be one or more RS codes between the corrupted RS code and the replacement RS code. In certain embodiments, if a good replacement RS code cannot be found under the scheme described above with reference to FIGS. 5A and 5B, the scheme of FIGS. 6A and 6B can be optionally used to find a good replacement RS code. A skilled technologist will appreciate that the selection of replacement RS codes can vary widely depending on the video frame and video packet configurations.

Figure 7A:
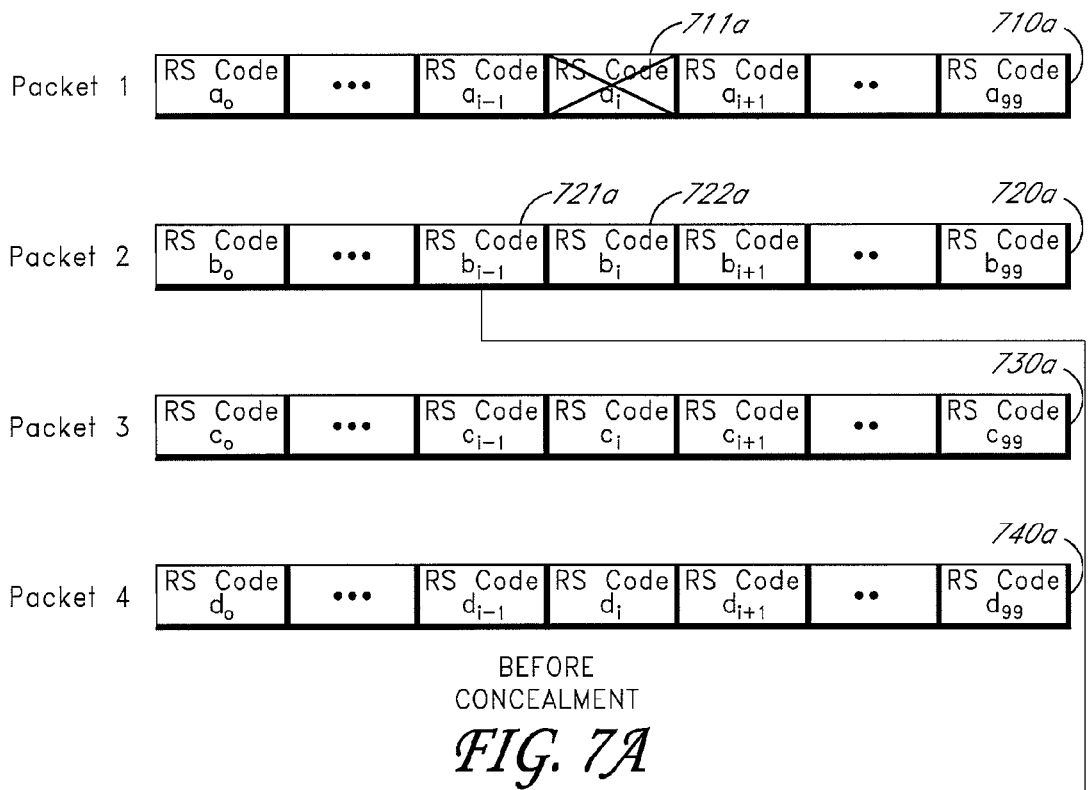
FIGS. 7A and 7B illustrate a method of concealing corrupted RS codes according to yet another embodiment.
Figure 7B:
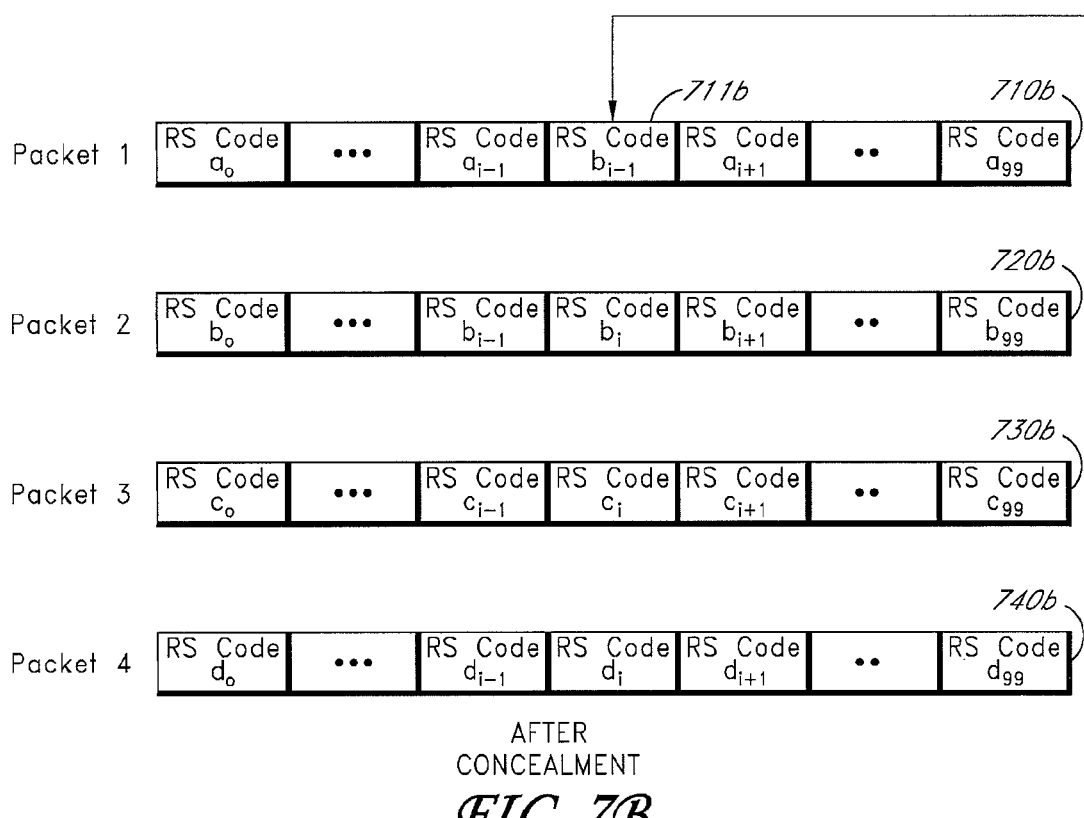

Referring to FIGS. 7A and 7B, a method of concealing a corrupted RS code according to another embodiment will now be described. FIG. 7A illustrates an example of four original video packets transmitted from a transmitter to a receiver. The four video packets include first to fourth video packets 710a, 720a, 730a, 740a. In the example, the first video packet 710a includes an RS code 711a which has been corrupted during the wireless transmission. The corrupted RS code 711a is at the i-th position in the first video packet 710a.

FIG. 7B illustrates an example of four video packets 710b, 720b, 730b, 740b with the corrupted RS code 711a having been replaced by a replacement RS code 711b. In the illustrated example, the replacement RS code 711b is a copy of a good RS code 721a from the original second video packet 720a. The illustrated good RS code 721a is immediately adjacent to an RS code 722a of the second video packet 720a. The location of the RS code 722a corresponds to that of the corrupted RS code 711a in the first video packet 710a. In other embodiments, there can be one or more RS codes between a replacement RS code and the corresponding RS code 722a. A skilled technologist will appreciate that the selection of replacement RS codes can vary widely depending on the video frame and video packet configurations.

Figure 8:
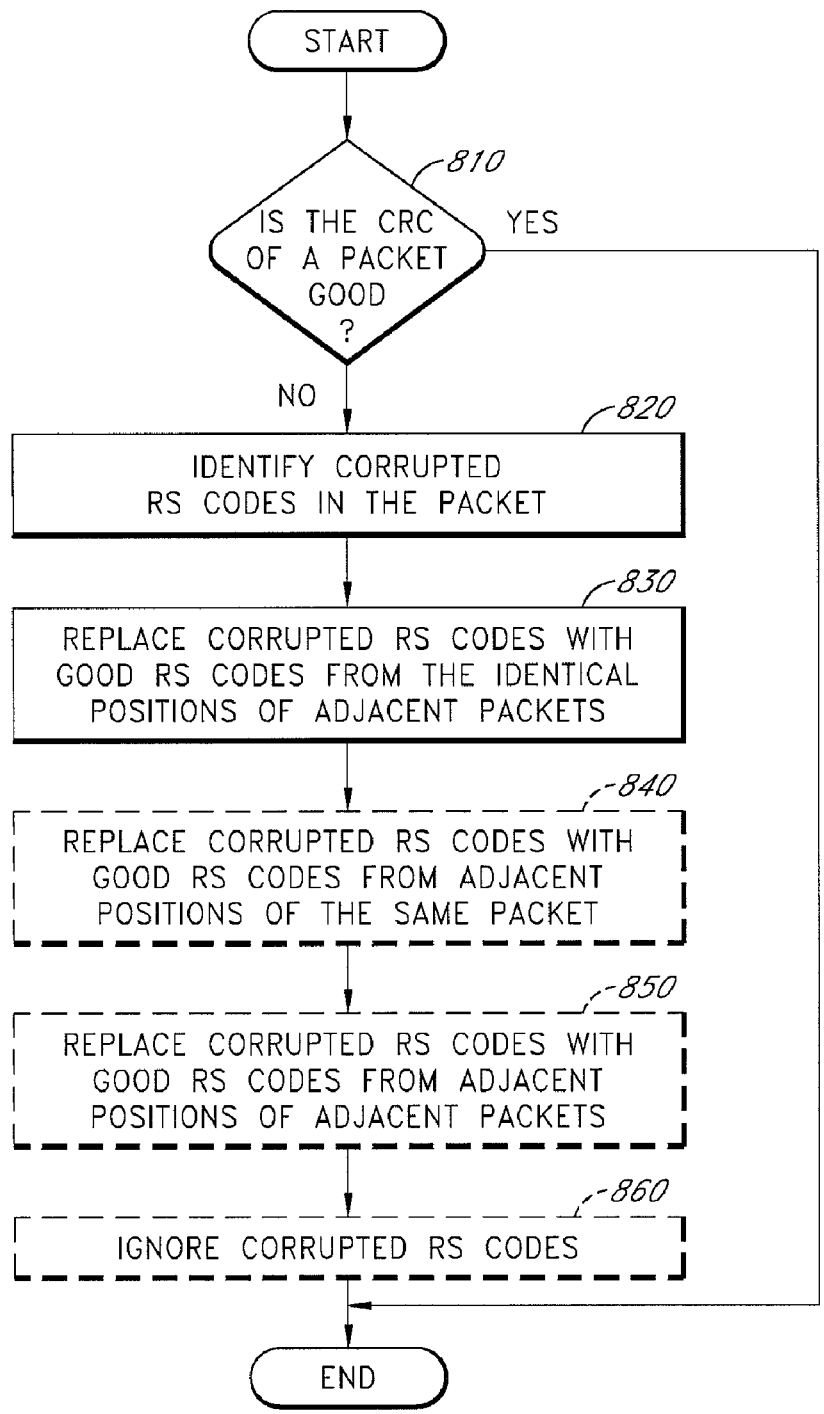
FIG. 8 is a flowchart illustrating a method of concealing corrupted RS codes according to one embodiment.

FIG. 8 is a flowchart illustrating a method of concealing corrupted video data portions or blocks at a receiver of a wireless communication system according to one embodiment. At block 810, it is determined whether the CRC checksum of a video packet is good. If yes, the method is terminated as there is no corrupted video data in the packet, and the packet may be passed along for further processing. In typical wireless schemes, if the CRC checksum fails, the packet is discarded. However, in the embodiment described herein, the packet is not discarded and may be modified as will be described below.

If the CRC checksum of a video packet does not match the calculated checksum (i.e., if the answer at block 810 is "No"), it is determined whether any of RS codes in the video packet has been corrupted during wireless transmission at block 820. In one embodiment where an RS (224, 216, t=4) coding scheme is used, the receiver can self-correct up to four bytes. In such an embodiment, an RS code is determined to be in error if the RS code has more than four bytes in error, in which case it is not self-correctable.

At block 830, if any of the RS codes in the video packet is found to have been corrupted, the method described above with reference to FIGS. 5A and 5B is performed to replace the corrupted RS code. If there still remain corrupted RS codes after the replacement at block 830, the method described above with reference to of FIGS. 6A and 6B is performed to replace the remaining corrupted RS codes at block 840.

If there still remain corrupted RS codes after the replacement at block 840, the method described above with reference to FIGS. 7A and 7B is performed to replace the corrupted RS codes at block 850. If there still remain corrupted RS codes, these corrupted RS codes may be ignored and passed along for further processing without being replaced (block 860). In another embodiment, two or more of the blocks 830-860 can be consolidated into one. In yet another embodiment, one or more of the blocks 830-860 can be omitted. In other embodiments, the order of the blocks 830-860 can be different.

Figure 9A:
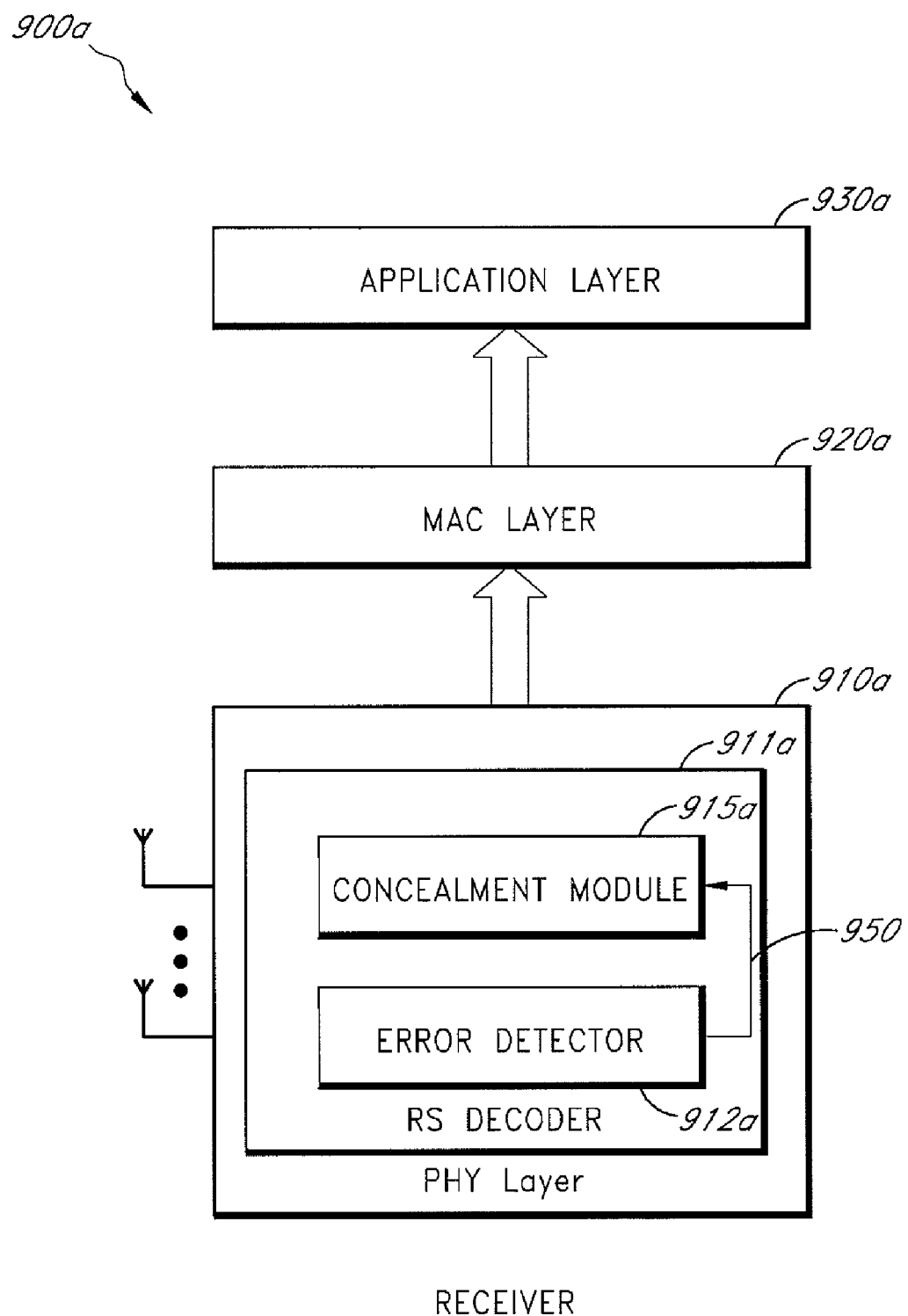
FIG. 9A is a block diagram of one embodiment of a wireless receiver including an error detector and a concealment module according to one embodiment.

Referring to FIG. 9A, a receiver 900a that conceals corrupted or erroneous data portions according to one embodiment will now be described. The illustrated receiver 900a includes a PHY layer 910a, a MAC layer 920a, and an application layer 930a. The detailed configurations of the layers

910a, 920a, 930a can be as described above with respect to those of FIG. 3A. The illustrated PHY layer 910a includes an RS decoder 911a.

The RS decoder 911a is used to decode RS codes in video packets transmitted from a transmitter. The illustrated RS decoder 911a includes an error detector 912a and a concealment module 915a.

The error detector 912a determines whether any of RS codes in a video packet has been corrupted during the wireless transmission from the transmitter. In the illustrated embodiment, the error detector 912a also generates a status signal 950 indicative of the status of the RS codes in the video packet.

Figure 10:
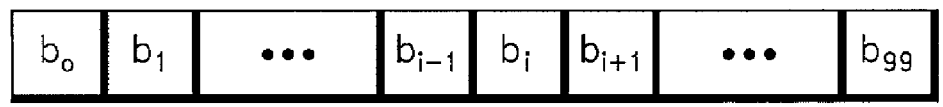
FIG. 10 illustrates one embodiment of a status signal indicative of the status of RS codes in a video data packet.

In one embodiment, the status signal 950 can have a frame format as shown in FIG. 10. The status signal 950 can be a bitmap. The status signal 950 may include the same number of digits as the number of RS codes in a single video packet. In the illustrated embodiment, each video packet includes 100 RS codes, and the status signal 950 may include 100 digits b0-b99. Each of the digits represents the status of a respective one of the 100 RS codes. In other embodiments, the status signal may include the status of RS codes in two or more video packets. Each of the digits can indicate whether a respective one of the RS codes is in error. In the illustrated embodiment, the digits can be binary digits, i.e., bits. In other embodiments, the digits can represent more than two states of the RS codes. A skilled technologist will appreciate that various other configurations of frame formats can also be used for the status signal. The RS decoder 911a is further configured to send the status signal to the concealment module 915a.

Referring back to FIG. 9A, the concealment module 915a performs one or more of the methods described above with reference to FIGS. 5A-5B, 6A-6B, and 7A-7B. The concealment module 915a receives the status signal 950 from the error detector 912a and replaces corrupted RS codes with good RS codes based on the status of the RS codes indicated by the status signal 950. The concealment module 915a can select any of the methods FIGS. 5A-5B, 6A-6B, and 7A-7B, depending on the availability of good RS codes in the video packets. If none of the methods provides correction of corrupted RS codes, the concealment module 915a may ignore the corrupted RS codes without correction as in block 860 of FIG. 8. After performing the concealment process at the concealment module 915a, the RS decoder 911a decodes each RS codes into a block of video data and passes it along for further processing.

In other embodiments, the concealment module may be external to the RS decoder and within the PHY layer 910a. In such embodiments, the concealment module receives blocks of decoded video data along with a status signal from the RS decoder. The concealment module performs processes similar to those shown in FIGS. 5A-5B, 6A-6B, and 7A-7B. The concealment module, however, processes decoded video data blocks (i.e., conceals corrupted decoded video data blocks) rather than RS codes. In such embodiments, each of the decoded video data blocks may be a portion of data that was included in a single RS code before being decoded.

Figure 9B:
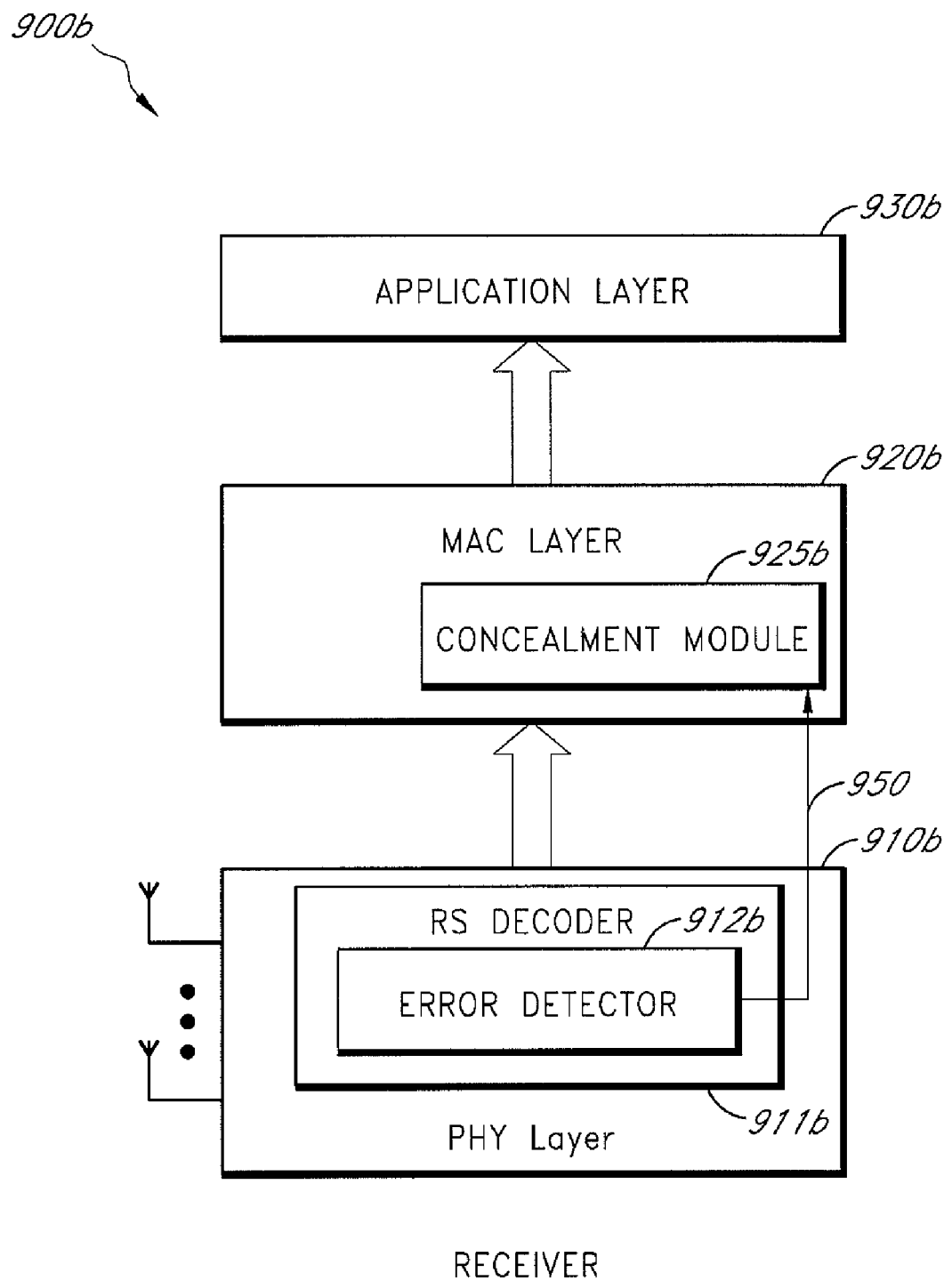
FIG. 9B is a block diagram of one embodiment of a wireless receiver including an error detector and a concealment module according to another embodiment.

Referring to FIG. 9B, a receiver 900b that conceals corrupted or erroneous video data portions according to another embodiment will now be described. The illustrated receiver 900b includes a PHY layer 910b, a MAC layer 920b, and an application layer 930b. The configurations of the layers 910b, 920b, 930b can be as described above with respect to those of FIG. 3A.

The illustrated PHY layer 910b includes an RS decoder 911b which includes an error detector 912b. The MAC layer 920b includes a concealment module 925b. The functions of the RS decoder 911b and the concealment module 925b can be similar to those of the RS decoder 911a and the concealment module 915a of FIG. 9A.

In the illustrated embodiment, the error detector 912b in the RS decoder 911b generates a status signal 950 and sends it to the concealment module 925b in the MAC layer 920b. The configuration of the status signal 950 can be as described above with respect to that of FIG. 10.

The concealment module 925b performs processes similar to those shown in FIGS. 5A-5B, 6A-6B, and 7A-7B. The concealment module 925b, however, processes decoded video data blocks (i.e., conceals corrupted decoded video data blocks) rather than RS codes. Each of the decoded video data blocks may be a portion of data that was included in a single RS code before being decoded.

Figure 9C:
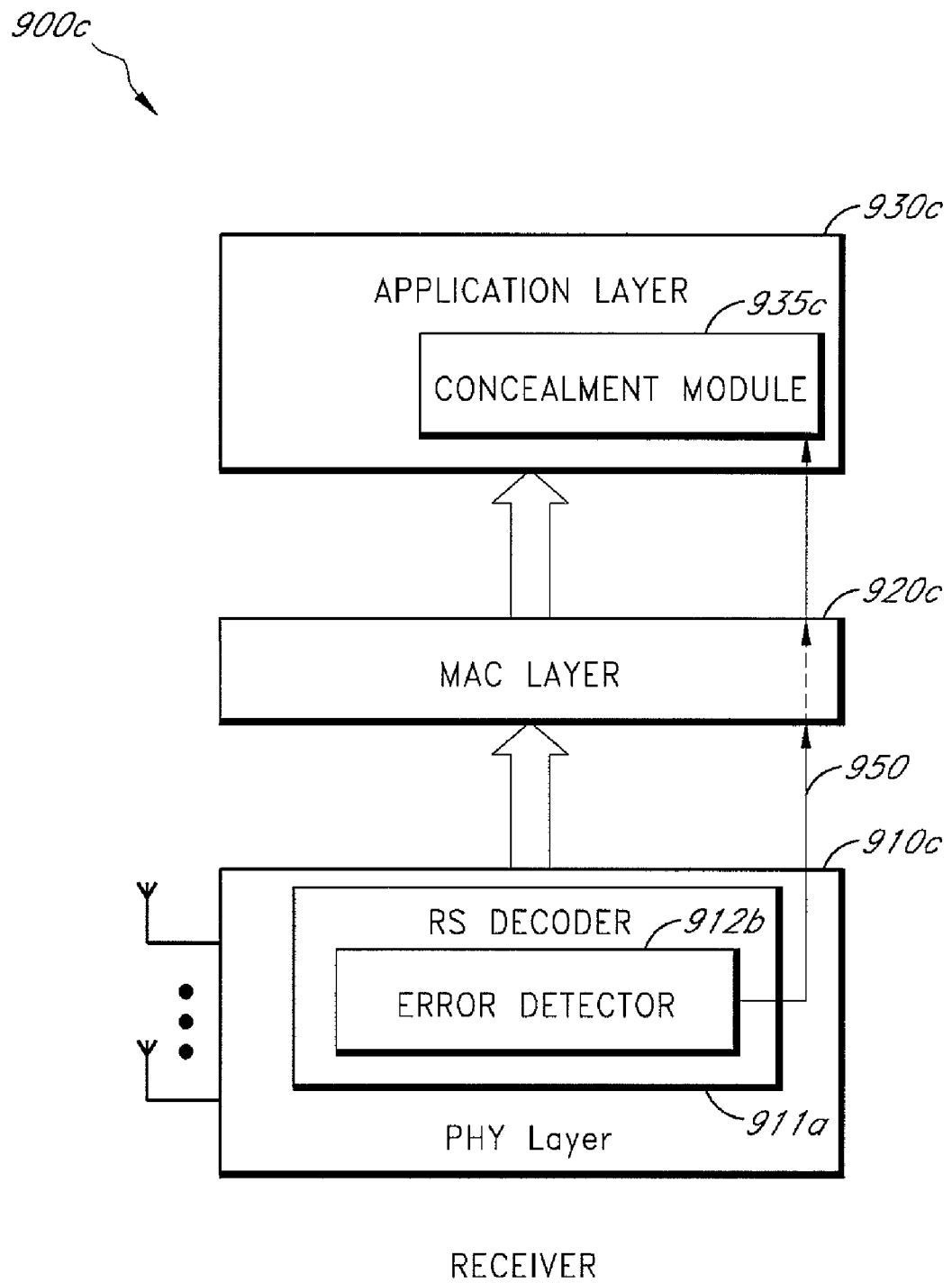
FIG. 9C is a block diagram of one embodiment of a wireless receiver including an error detector and a concealment module according to yet another embodiment.

Referring to FIG. 9C, a receiver 900c that conceals corrupted or erroneous video data portions according to yet another embodiment will now be described. The illustrated receiver 900c includes a PHY layer 910c, a MAC layer 920c, and an application layer 930c. The detailed configurations of the layers 910c, 920c, 930c can be as described above with respect to those of FIG. 3A. The illustrated PHY layer 910c includes an RS decoder 911c which includes an error detector 912b. The application layer 920c includes a concealment module 935c. The functions of the error detector 912c and the concealment module 935b can be similar to those of the error detector 912a and the concealment module 915a of FIG. 9B.

In the illustrated embodiment, the error detector 912c generates a status signal 950 and sends it to the concealment module 935c in the application layer 920c. The configuration of the status signal 950 can be as described above with respect to that of FIG. 10.

The concealment module 935c performs processes similar to those shown in FIGS. 5A-5B, 6A-6B, and 7A-7B. The concealment module 935c, however, processes decoded video data blocks (i.e., conceals corrupted decoded video data blocks) rather than RS codes. Each of the decoded video data blocks may be a portion of data that was included in a single RS code before being decoded.

Figure 11:
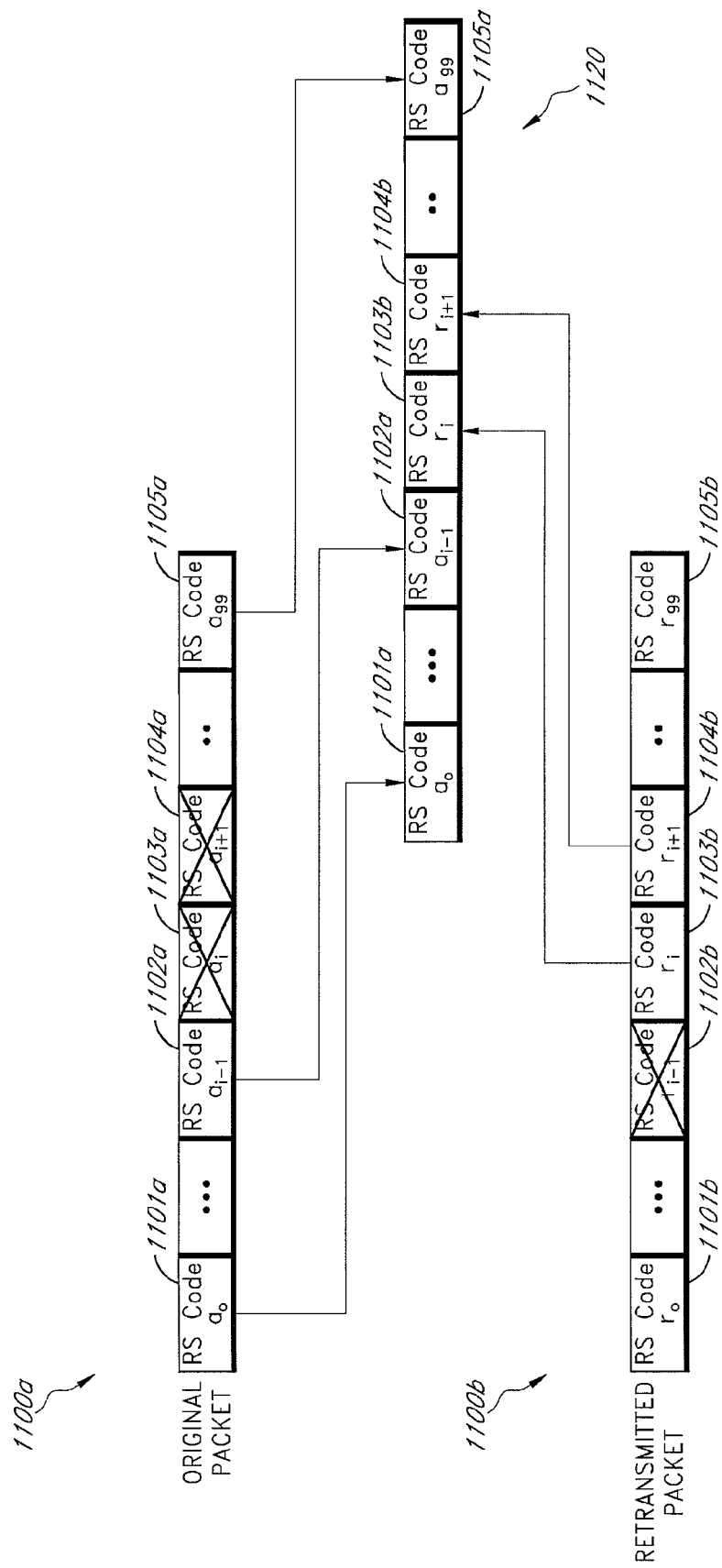
FIG. 11 illustrates a method of concealing corrupted RS codes with retransmission packets according to another embodiment.

Referring to FIG. 11, a method of correcting a corrupted or erroneous video data portion according to another embodiment will now be described. In the illustrated embodiment, a video packet 1100a is transmitted from a transmitter to a receiver over a wireless channel. Then, it is determined at the receiver if any of RS codes 1101a-1105a in the video packet 1100a has been corrupted during the wireless transmission. If there are corrupted RS codes, the video packet is retransmitted from the transmitter to the receiver. Then, it is determined at the receiver if any of RS codes 1101b-1105b in the retransmitted video packet 1100b has been corrupted during the retransmission.

With the original and retransmitted video packets 1100a, 1100b, a new video packet 1120 may be constructed. The new video packet 1120 can be formed by combining good RS codes selected from the original video packet 1100a and the retransmitted video packet 1100b. For example, if RS codes 1103a and 1104a have been corrupted during the original transmission, RS codes 1103b and 1104b at the same positions in the retransmitted video packet 1100b, if they have not been corrupted, can be used to replace the corrupted RS codes 1103a, 1104a.

Figure 12:
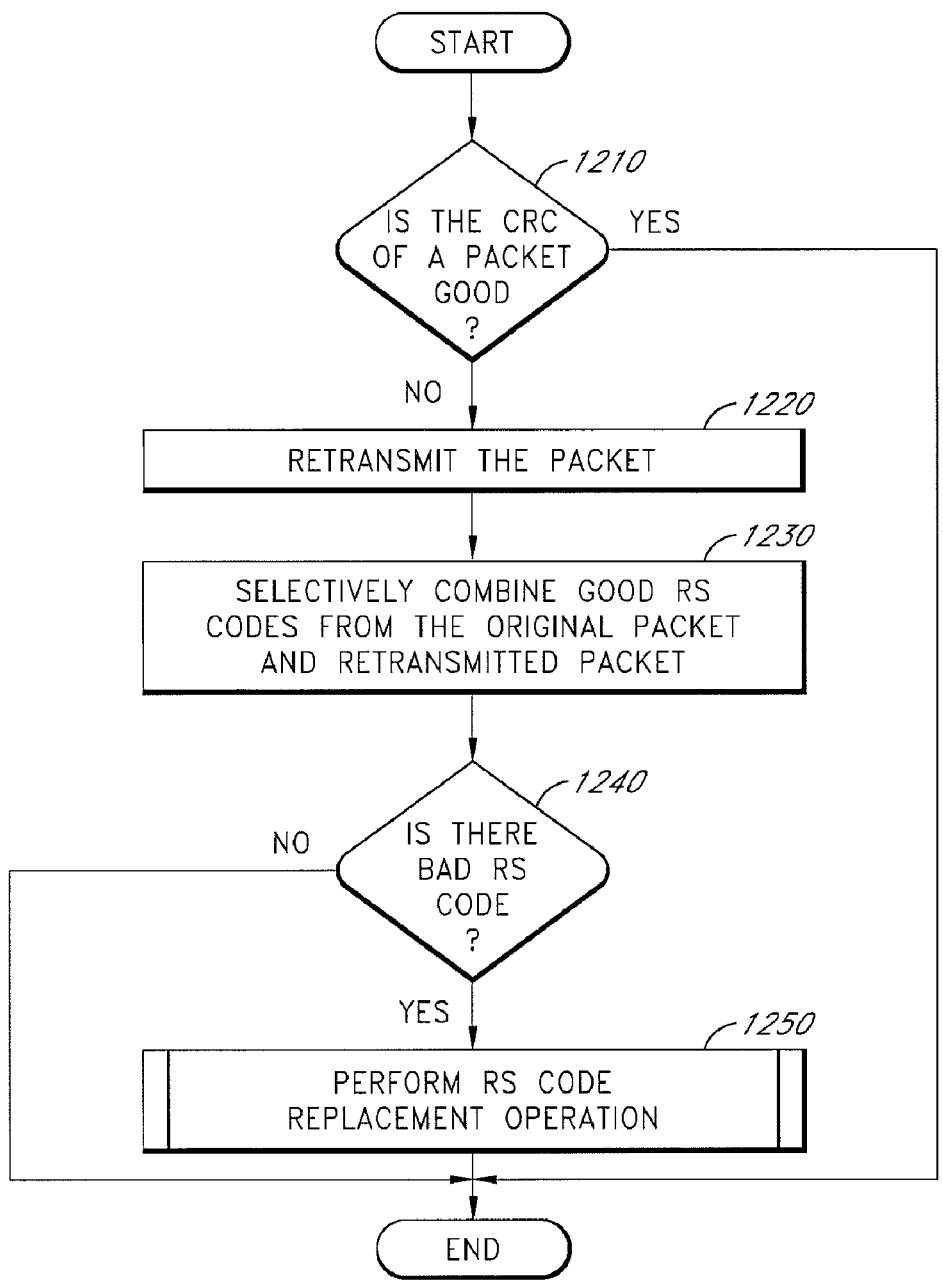
FIG. 12 is a flowchart illustrating a method of concealing corrupted RS codes with retransmission packets according to yet another embodiment.

FIG. 12 is a flowchart illustrating one embodiment of a method of correcting a corrupted or erroneous video data portion using the scheme described above in connection with FIG. 11. In the illustrated embodiment, at block 1210, it is determined if the CRC of a video packet which is transmitted from a transmitter to a receiver is good. If yes, the method is terminated. If not, the video packet is retransmitted from the transmitter to the receiver at block 1220. Then, at block 1230, a new video packet may be constructed by combining good RS codes selected from the original video packet and the retransmitted video packet, as shown in FIG. 11.

Then, at block 1240, it is determined if there still remain corrupted RS codes. If no, the process is terminated. If yes, a RS code replacement method is performed (block 1250) as described above with respect to the blocks 830, 840, 850 of FIG. 8. Then, the method is terminated.

In other embodiments, the number of RS codes in a video packet can vary widely depending on the video packet design. In addition, a skilled artisan will appreciate that the embodiments described above can be implemented with any suitable kinds of error correction codes.

In at least some of the embodiments described above, a receiver can effectively conceal corrupted data blocks in a video data packet without retransmission of the video data packet. This configuration effectively reduces wireless channel use associated with data retransmission. In other embodiments described above, a wireless video system can provide robust error correction by combining retransmission with one or more error concealment schemes described above.

The foregoing description is that of embodiments of the invention and various changes, modifications, combinations and sub-combinations may be made without departing from the spirit and scope of the invention, as defined by the appended claims.

What is claimed is:

1. A method of wireless communication for uncompressed video data, the method comprising:
    employing a wireless communication device for
        receiving a plurality of video packets transmitted over a wireless channel, each of the video packets including a plurality of data blocks, wherein the data blocks in the plurality of video packets together form video data representing at least part of a video frame, wherein each of the data blocks includes a plurality of displayable elements, and wherein each of the data blocks is encoded with an error correction code (ECC);
        determining whether any of the plurality of data blocks in the video packets has been corrupted, using the ECC, while being transmitted over the wireless channel; and
        replacing a corrupted data block with an uncorrupted data block selected from the plurality of data blocks in the plurality of video packets, the corrupted data block including a first displayable element on the video frame, the uncorrupted data block including a second displayable element on the video frame, the uncorrupted data block being selected at least partially based on proximity between the first and second displayable elements on the video frame.

2. The method of claim 1, wherein the error correction code comprises a Reed-Solomon (RS) code.

3. The method of claim 1, wherein the displayable elements comprise uncompressed pixel data.

4. The method of claim 1, wherein the video packets include a first video packet and a second video packet which include displayable elements positioned proximate to one another in the video frame, wherein each of the first and second video packets includes a plurality of data blocks arranged in sequence, wherein the corrupted data block is at a first position in the first video packet, and wherein the selected uncorrupted data block is at a second position in the second video packet, the second position in the second video packet corresponding to the first position in the first video packet.

5. The method of claim 1, wherein the video packets include a first video packet and a second video packet which include displayable elements positioned proximate to one another in the video frame, wherein each of the first and second video packets includes data blocks arranged in sequence, wherein the corrupted data block is at a first position in the first video packet, and wherein the selected uncorrupted data block is at a second position in the second video packet, the second position in the second video packet being adjacent to a first position in the second video packet, the first position in the second video packet corresponding to the first position in the first video packet.

6. The method of claim 1, wherein the video packets include a first video packet which includes displayable elements positioned proximate to one another in the video frame, wherein the first video packet includes data blocks arranged in sequence, wherein the corrupted data block is at a first position in the first video packet, and wherein the selected uncorrupted data block is at a second position in the first video packet, the second position being adjacent to the first position.

7. The method of claim 1, further comprising decoding the ECC-encoded data blocks after determining whether any of the plurality of data blocks in the video packets has been corrupted and before replacing the corrupted data block with the uncorrupted data block.

8. The method of claim 1, wherein the corrupted data block is not replaced if no uncorrupted data block is found from the plurality of data blocks in the plurality of video packets based on proximity between the first and second displayable elements on the video frame.

9. The method of claim 1, wherein the plurality of video packets includes a first video packet, wherein the method further comprises before the replacing:
    receiving a retransmitted first video packet including a plurality of data blocks;
    determining if any of data blocks in the retransmitted first video packet has been corrupted while being retransmitted; and
    combining uncorrupted data blocks selected from the first video packet and the retransmitted first video packet.

10. The method of claim 1, further comprising generating a status signal indicative of whether any of the plurality of data blocks in the video packets has been corrupted at least partially based on the determining, wherein the replacing is performed in accordance with the status represented by the status signal.

11. The method of claim 1, wherein the wireless channel comprises a 60 GHz channel.

12. A wireless communication device for receiving uncompressed video data, the device comprising:
    a receiver configured to receive a plurality of video packets transmitted over a wireless channel, each of the video packets including a plurality of data blocks, wherein the data blocks in the plurality of video packets together form video data representing at least part of a video frame, wherein each of the data blocks includes a plurality of displayable elements, and wherein each of the data blocks is encoded with an error correction code (ECC);
    wherein the receiver is further configured to determine whether any of the plurality of data blocks in the video packets has been corrupted while being transmitted over the wireless channel; and wherein the receiver is further configured to replace a corrupted data block with an uncorrupted data block selected from the plurality of data blocks in the plurality of video packets, the corrupted data block including a first displayable element on the video frame, the uncorrupted data block including a second displayable element on the video frame, the uncorrupted data block being selected at least partially based on proximity between the first and second displayable elements on the video frame.

13. The device of claim 12, wherein the error correction code comprises a Reed-Solomon (RS) code.

14. The device of claim 12, wherein the displayable elements comprise uncompressed pixel data.

15. The device of claim 12, wherein the video packets include a first video packet and a second video packet which include displayable elements positioned proximate to one another in the video frame, wherein each of the first and second video packets includes a plurality of data blocks arranged in sequence, wherein the corrupted data block is at a first position in the first video packet, and wherein the selected uncorrupted data block is at a second position in the second video packet, the second position in the second video packet corresponding to the first position in the first video packet.

16. The device of claim 12, wherein the video packets include a first video packet and a second video packet which include displayable elements positioned proximate to one another in the video frame, wherein each of the first and second video packets includes data blocks arranged in sequence, wherein the corrupted data block is at a first position in the first video packet, and wherein the selected uncorrupted data block is at a second position in the second video packet, the second position in the second video packet being adjacent to a first position in the second video packet, the first position in the second video packet corresponding to the first position in the first video packet.

17. The device of claim 12, wherein the video packets include a first video packet which includes displayable elements positioned proximate to one another in the video frame, wherein the first video packet includes data blocks arranged in sequence, wherein the corrupted data block is at a first position in the first video packet, and wherein the selected uncorrupted data block is at a second position in the first video packet, the second position being adjacent to the first position.

18. The device of claim 12, wherein the receiver is further configured to decode the ECC-encoded data blocks.

19. The device of claim 12, wherein the plurality of video packets include a first video packet, wherein the receiver is further configured to receive a retransmitted first video packet including a plurality of data blocks, wherein the receiver is further configured to determine if any of data blocks in the retransmitted first video packet has been corrupted while being retransmitted; and wherein the receiver is further configured to combine uncorrupted data blocks selected from the first video packet and the retransmitted first video packet.

20. The device of claim 12, wherein the receiver is further configured to generate a status signal indicative of whether any of the plurality of data blocks in the video packets has been corrupted at least partially based on the determining, wherein the receiver is further configured to replace the corrupted data block in accordance with the status represented by the status signal.

21. The device of claim 12, wherein the receiver comprises a PHY layer, a MAC layer, and an application layer, wherein the PHY layer is configured to determine whether any of the plurality of data blocks in the video packets has been corrupted; and wherein one of the PHY layer, the MAC layer, and the application layer is further configured to replace the corrupted data block.

22. An audiovisual device, comprising:
the device of claim 12; and
electronic circuitry configured to process the received video data.

23. A wireless communication system for uncompressed video data comprising:
a transmitter configured to transmit a plurality of video packets over a wireless channel, each of the video packets including a plurality of data blocks, wherein the data blocks in the plurality of video packets together form video data representing at least part of a video frame, wherein each of the data blocks includes a plurality of displayable elements, and wherein each of the data blocks is encoded with an error correction code (ECC); and
a receiver configured to receive the plurality of video packets transmitted over the wireless channel, and to decode the ECC-encoded data blocks,
wherein the receiver is further configured to determine whether any of the plurality of data blocks in the video packets has been corrupted while being transmitted over the wireless channel; and
wherein the receiver is further configured to replace a corrupted data block with an uncorrupted data block selected from the plurality of data blocks in the plurality of video packets, the corrupted data block including a first displayable element on the video frame, the uncorrupted data block including a second displayable element on the video frame, the uncorrupted data block being selected at least partially based on proximity between the first and second displayable elements on the video frame.

24. The system of claim 23, wherein the video packets include a first video packet and a second video packet which include displayable elements positioned proximate to one another in the video frame, wherein each of the first and second video packets includes a plurality of data blocks arranged in sequence, wherein the corrupted data block is at a first position in the first video packet, and wherein the selected uncorrupted data block is at a second position in the second video packet, the second position in the second video packet corresponding to the first position in the first video packet.

25. The system of claim 23, wherein the video packets include a first video packet and a second video packet which include displayable elements positioned proximate to one another in the video frame, wherein each of the first and second video packets includes data blocks arranged in sequence, wherein the corrupted data block is at a first position in the first video packet, and wherein the selected uncorrupted data block is at a second position in the second video packet, the second position in the second video packet being adjacent to a third position in the second video packet, the third position in the second video packet corresponding to the first position in the first video packet.

26. The system of claim 23, wherein the video packets include a first video packet which includes displayable elements positioned proximate to one another in the video frame, wherein the first video packet includes data blocks arranged in sequence, wherein the corrupted data block is at a first position in the first video packet, and wherein the selected uncorrupted data block is at a second position in the first video packet, the second position being adjacent to the first position.

27. The system of claim 23, wherein the wireless channel comprises a 60 GHz channel.

* * * * *